(12) United States Patent
Shepherd et al.

(10) Patent No.: US 8,635,541 B2
(45) Date of Patent: Jan. 21, 2014

(54) INDICATING PENDING ASYNCHRONOUS UPDATES IN A GRAPHICAL USER INTERFACE (GUI)

(75) Inventors: David J. Shepherd, Victoria (CA); David F. Manning, Victoria (CA)

(73) Assignee: International Business Machines Corporation, Armonk, NY (US)

( * ) Notice: Subject to any disclaimer, the term of this patent is extended or adjusted under 35 U.S.C. 154(b) by 1163 days.

(21) Appl. No.: 11/951,703

(22) Filed: Dec. 6, 2007

(65) Prior Publication Data

US 2009/0150805 A1 Jun. 11, 2009

(51) Int. Cl.
G06F 3/00 (2006.01)
G06F 3/048 (2013.01)

(52) U.S. Cl.
USPC .......................................... 715/760; 715/780

(58) Field of Classification Search
USPC .......................................................... 715/760
See application file for complete search history.

(56) References Cited

U.S. PATENT DOCUMENTS

| | | | | | |
|---|---|---|---|---|---|
| 4,954,941 | A | * | 9/1990 | Redman | 717/162 |
| 5,590,269 | A | * | 12/1996 | Kruse et al. | 705/9 |
| 6,147,687 | A | * | 11/2000 | Wanderski | 715/853 |
| 6,209,036 | B1 | * | 3/2001 | Aldred et al. | 709/229 |
| 6,243,089 | B1 | * | 6/2001 | Gong | 715/744 |
| 6,463,461 | B1 | * | 10/2002 | Hanson et al. | 709/204 |
| 6,901,435 | B1 | * | 5/2005 | Sulcer et al. | 709/219 |
| 2003/0140117 | A1 | * | 7/2003 | Kunz | 709/218 |
| 2004/0068691 | A1 | * | 4/2004 | Asbury | 715/500 |
| 2004/0258089 | A1 | * | 12/2004 | Derechin et al. | 370/465 |
| 2007/0124460 | A1 | * | 5/2007 | McMullen et al. | 709/224 |
| 2007/0208991 | A1 | * | 9/2007 | Rider | 715/501.1 |
| 2007/0234195 | A1 | * | 10/2007 | Wells | 715/501.1 |
| 2007/0245238 | A1 | * | 10/2007 | Fugitt et al. | 715/700 |
| 2008/0276193 | A1 | * | 11/2008 | Pettinati | 715/780 |
| 2008/0320050 | A1 | * | 12/2008 | Chan | 707/200 |

FOREIGN PATENT DOCUMENTS

TW 462010 A 6/2000

OTHER PUBLICATIONS

Chen et al., "Method for Supporting Webpage Dynamic Update", Publication No. TW 462010A, pp. 1-2, Dated Nov. 1, 2001.
http://ajaxpatterns.org/Progress_Indicator, "Progress Indicator", from Ajax Patterns, pp. 1-9, Mar. 8, 2007.
http://www.javareference.com/mvnforum/viewthread?thread=478, "Javareference Forum—View Thread—Showing Ajax Progress Indicator", pp. 1-4, Aug. 30, 2006.
http://weblogs.asp.net/scottgu/archive/2006/09/21/Tip_2F00_Trick_3A00_-UpdateProgressControl-and-AJAX-Activity-Image-Animations.aspx, "Tip/Trick: UpdateProgress Control and AJAX Activity Image Animations", pp. 1-7, Sep. 21, 2006.
http://aspnetresources.com/blog/callback_progress_indicator.aspx, "Displaying Progress Indicator During Callbacks", pp. 1-2, Published: Mar. 3, 2006.

* cited by examiner

*Primary Examiner* — Stephen Alvesteffer
(74) *Attorney, Agent, or Firm* — Jeff Tang; Hoffman Warnick LLC

(57) ABSTRACT

The present invention provides a mechanism to display exactly which parts of a GUI are being updated by non-blocking or asynchronous interaction with a server. It also allows the user to continue to interact with unaffected portions of the display and therefore can be used to provide a superior user experience. Specifically, the present invention displays a busy or progress indicator at the element level of granularity, indicating that the value of the element is currently undergoing a non-blocking or asynchronous update.

17 Claims, 6 Drawing Sheets

Mortgage Requirements

Provide the following mortgage information:

| | |
|---|---|
| Mortgage Amount | $3,453.00 — 20A |
| Down Payment | $234.00 — 20B |
| Interest Rate | % — 20C |

INDICATING PENDING ASYNCHRONOUS UPDATES IN A GRAPHICAL USER INTERFACE (GUI)

FIELD OF THE INVENTION

The present invention generally relates to asynchronous updates. Specifically, the present invention relates to the indication of pending asynchronous elements in a GUI such as a web page.

BACKGROUND OF THE INVENTION

"Asynchronous" in the context of a Web browser or the like refers to interaction with a server that occurs between complete page refreshes. An asynchronous update possesses the benefit that the entire page content does not need to be refreshed from a server when updates will only affect parts of the page or add incremental content. During an asynchronous update, the user can simply be blocked from interacting with the interface. However, continuing to permit interaction with portions of the page not affected by the asynchronous update represents a superior user experience. Instead of being blocked intermittently, the user's interaction with the interface flows continuously. Graphical User Interfaces (GUI) such as Web browsers also commonly show busy indicators, such as a progress bar, on blocking tasks that affect the entire page display, such as loading a new HTML page. Using such an indicator even if the user is not blocked from interacting with the interface during an asynchronous update, does not provide sufficient information to users on which parts of the display are affected by an asynchronous update. In view of the foregoing, there exists a need for an approach that solves at least one of the deficiencies in the related art.

SUMMARY OF THE INVENTION

In general, the present invention provides a mechanism to display exactly which parts of a GUI are being updated by non-blocking or asynchronous interaction with a server. It also allows the user to continue to interact with unaffected portions of the display and therefore can be used to provide a superior user experience. Specifically, the present invention displays a busy or progress indicator at the element level of granularity, indicating that the value of the element is currently undergoing a non-blocking or asynchronous update. An element is any component (e.g., a field) of the GUI capable of communicating or displaying a data value to the user. Elements may include a combination of text and graphics. The indicator may be an icon, an animated graphic, a small progress bar, or a modification of the element display such as background color or border. The indicator will become visible when an asynchronous request that may affect a value is queued, and the indicator will become invisible when the value is returned by the asynchronous interaction and used to update the element's display. A brief change in the busy or progress indicators display state, such as flashing or a color change, may be used to indicate that a value has been updated. That is, the indicator can be provided at a first state during update, and changed to a second state (e.g., taken away, changed color, etc.) when the update is complete.

A first aspect of the present invention provides a method for indicating a pending asynchronous update of a graphical user interface (GUI), comprising: providing a GUI having a first set of elements and a second set of elements; and indicating the pending asynchronous update of the first set of elements with a set of indicators, the second set of elements capable of receiving user interactions during the pending asynchronous update of the first set of elements.

A second aspect of the present invention provides a system for indicating a pending asynchronous update of a graphical user interface (GUI), comprising: a module for providing a GUI having a first set of elements and a second set of elements; and a module for indicating the pending asynchronous update of the first set of elements with a set of indicators, the second set of elements capable of receiving user interactions during the pending asynchronous update of the first set of elements.

A third aspect of the present invention provides a program product stored on a computer readable medium for indicating a pending asynchronous update of a graphical user interface (GUI), the computer readable medium comprising program code for causing a computer system to: provide a GUI having a first set of elements and a second set of elements; and indicate the pending asynchronous update of the first set of elements with a set of indicators, the second set of elements capable of receiving user interactions during the pending asynchronous update of the first set of elements.

A fourth aspect of the present invention provides a method for deploying a system for indicating a pending asynchronous update of a graphical user interface (GUI), comprising: providing an infrastructure being configured to: provide a GUI having a first set of elements and a second set of elements; and indicate the pending asynchronous update of the first set of elements with a set of indicators, the second set of elements capable of receiving user interactions during the pending asynchronous update of the first set of elements.

A fifth aspect of the present invention provides a data processing system for indicating a pending asynchronous update of a graphical user interface (GUI), comprising: a memory medium having instructions; a bus coupled to the memory medium; and a processor coupled to the bus that when executing the instructions causes the data processing system to: provide a GUI having a first set of elements and a second set of elements; and indicate the pending asynchronous update of the first set of elements with a set of indicators, the second set of elements capable of receiving user interactions during the pending asynchronous update of the first set of elements.

BRIEF DESCRIPTION OF THE DRAWINGS

These and other features of this invention will be more readily understood from the following detailed description of the various aspects of the invention taken in conjunction with the accompanying drawings in which:

FIG. 4 depicts an illustrative GUI in which multiple elements have completed an asynchronous update.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For clarity, the Detailed Description of the Drawings has the following sections.
I. General Description
II. Computerized Implementation I. General Description In general, the present invention provides a mechanism to display exactly which parts of a GUI are being updated by non-blocking or asynchronous interaction with a server. It also allows the user to continue to interact with unaffected portions of the display and therefore can be used to provide a superior user experience. Specifically, the present invention displays a busy or progress indicator at the element level of granularity, indicating that the value of the element is currently undergoing a non-blocking or asynchronous update. An element is any component (e.g., a field) of the GUI capable of communicating or displaying a data value to the user. Elements may include a combination of text and graphics. The indicator may be an icon, an animated graphic, a small progress bar, or a modification of the element display such as background color or border. The indicator will become visible when an asynchronous request that may affect a value is queued, and the indicator will become invisible when the value is returned by the asynchronous interaction and used to update the element's display. A brief change in the busy or progress indicators display state, such as flashing or a color change, may be used to indicate that a value has been updated. That is, the indicator can be provided at a first state during update, and changed to a second state (e.g., taken away, changed color, etc.) when the update is complete. As updates such as these are occurring, the user can freely interact with other elements of the GUI (i.e., elements not being updated).

Figure 1:
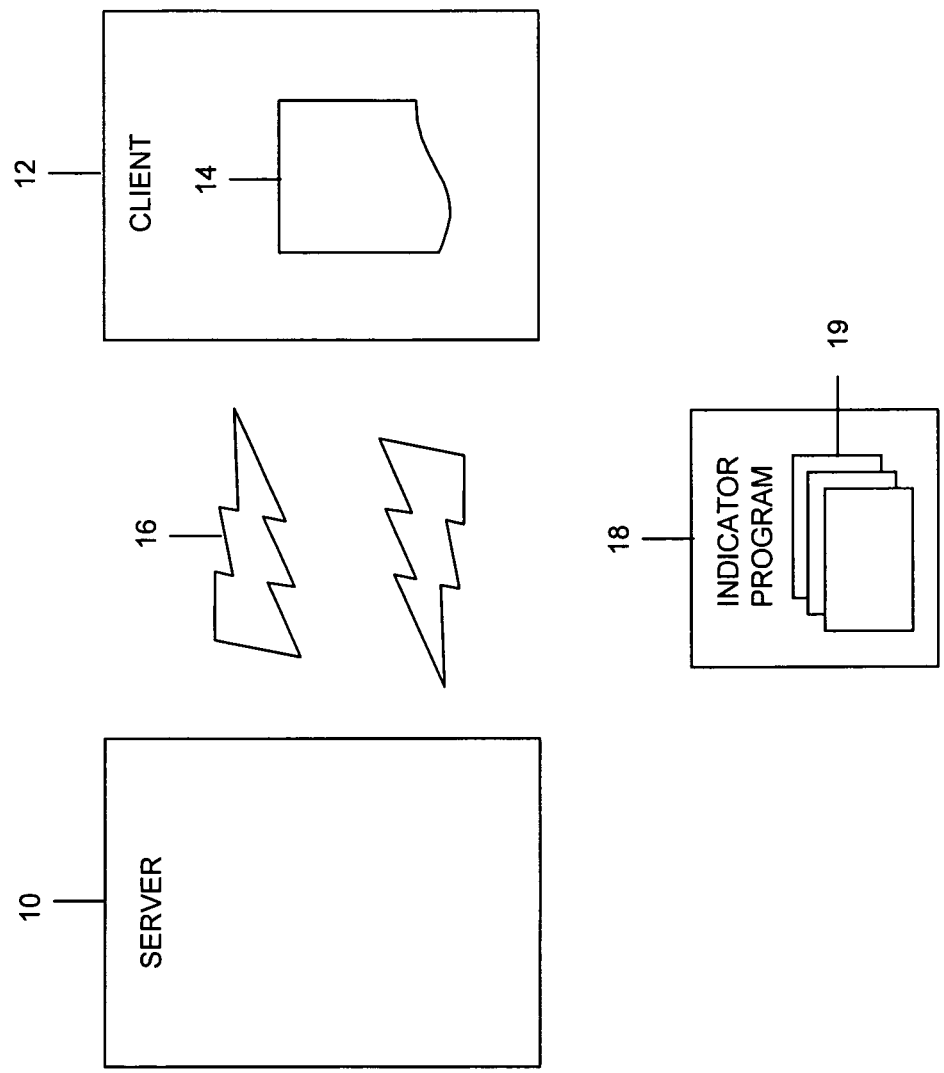
FIG. 1 depicts a block diagram of a client-server environment according to the present invention.
Figure 2:
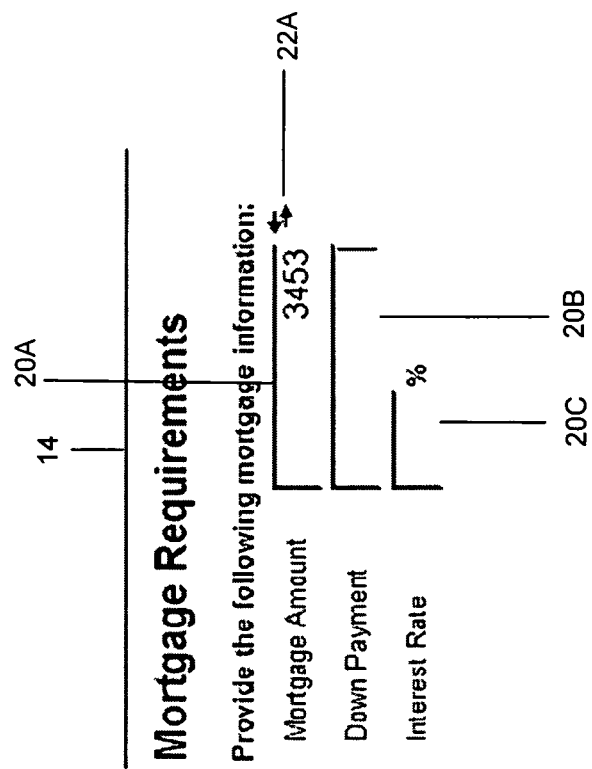
FIG. 2 depicts an illustrative GUI having an element undergoing a pending asynchronous update according to the present invention.

Referring now to FIG. 1, an illustrative client-server environment is shown. As depicted, client 12 communicates with server 10 over communications network 16. Under the present invention, communications network 16 can represent any type of network such as the Internet, A LAN, a WAN, a VPN, etc. As further shown, client 12 has GUI 14, which is intended to represent any type of GUI now known or later developed. Under the present invention, an indicator will be provided (at a first state) for any elements undergoing an (pending) asynchronous update. The indicator will be presented/changed to a second state upon completion of the update. Under the present invention, there can be a one-to-one relationship for elements undergoing an (pending) asynchronous update with indicators. That is, each element undergoing an (pending) asynchronous update can have its own indicator (although this need not be the case). As such, this disclosure will use the term "set" to refer to a quantity of at least one/one or more. For example, a GUI 14 can have a first set of elements undergoing a pending asynchronous update, and a second set of elements not undergoing a pending asynchronous update.

In a typical embodiment, the present invention uses JavaScript events to determine when the user has made a change that requires interaction with server 10. An event is sent to server 10 to process the change in data value is queued and transmitted to the server asynchronously. Several element updates may be pending simultaneously, as the user continues to interact with GUI 14. An indicator such as an icon is displayed next to any element (or group of elements) for which an asynchronous update is pending, and is removed when the asynchronous update is received back from server 10 and processed. Server 10's response to the event may in fact update elements on the display other than that which caused the asynchronous update event. In an embodiment, GUI 14 displays busy or progress indicators for every element which is affected by the asynchronous update. If the set of elements that may be affected is predictable, GUI 14 will associate with each element the set of elements which may be affected by an asynchronous update. The set of associated elements may be updated by the server either in a separate interaction, or piggybacking on the asynchronous update response. A separate asynchronous interaction with the server may even be used if the set of associated elements is not predictable and must be computed by the server. Although motivated by Asynchronous JavaScript and XML (AJAX), this technique may be applied to any GUI 14 in which parts of the display may be modified asynchronously, that is, while the user continues to interact with GUI 14.

It should be understood that this capability is provided by modules 19 of indicator program 18, which can reside on server 10 and/or client 12. In the case of the latter, indicator program 18 could be incorporated within the program(s) that provides GUI 14 (e.g., in a web browser program). Referring now to FIGS. 2-5, these concepts will be explained in greater detail. As first shown in FIG. 2, GUI 14 has elements 20A-C. The user has entered "3453" in the Mortgage Amount element 20A. Upon so doing, an asynchronous update is performed to format the value. To denote this asynchronous update, an (update) indicator 22A is generated and displayed at a first state as shown. Note that user interaction continues, and the user may enter a value in the focus element 20B, or set focus to the Interest Rate element 20C. Though not shown here, busy indicators 22A can be animated, a convention that indicates to users that work is occurring in the background. In addition, indicator 22A is typically positioned proximate element 20A being updated. Such placement allows the precise element 20A undergoing the asynchronous update to be clearly identified.

Figure 3:
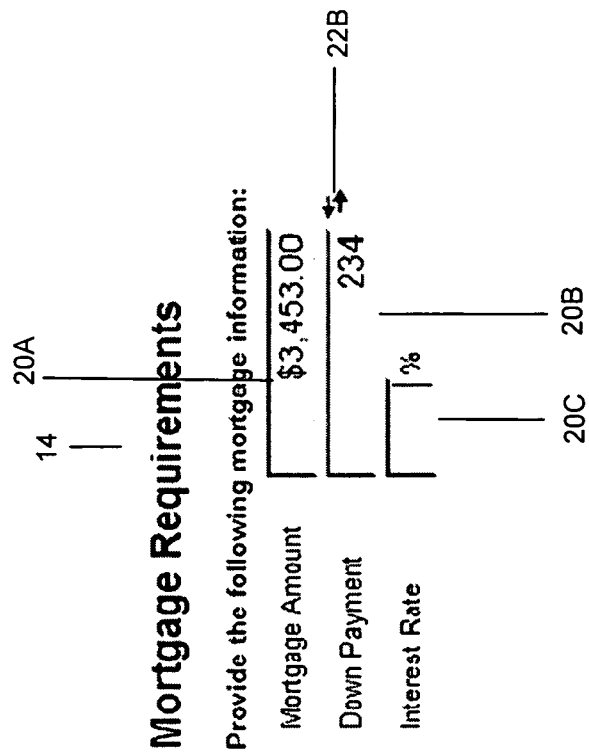
FIG. 3 depicts an illustrative GUI having an element undergoing a pending asynchronous update, and an element in which a pending asynchronous update was completed according to the present invention.

Referring to FIG. 3, the update is complete (e.g., the value in element 20A has been formatted). Upon such completion, indicator 22A (FIG. 6) is changed to a second state. In this example, the second state is to remove, delete, or otherwise make invisible indicator 22A. However, this need not be the case. Specifically, indicator 22A could have been changed in color, appearance, sound, etc. In addition, the user has changed focus to the Down Payment element 20B where the user entered the value of "234". An asynchronous request has been sent to validate and format the value of "234".

Figure 5:
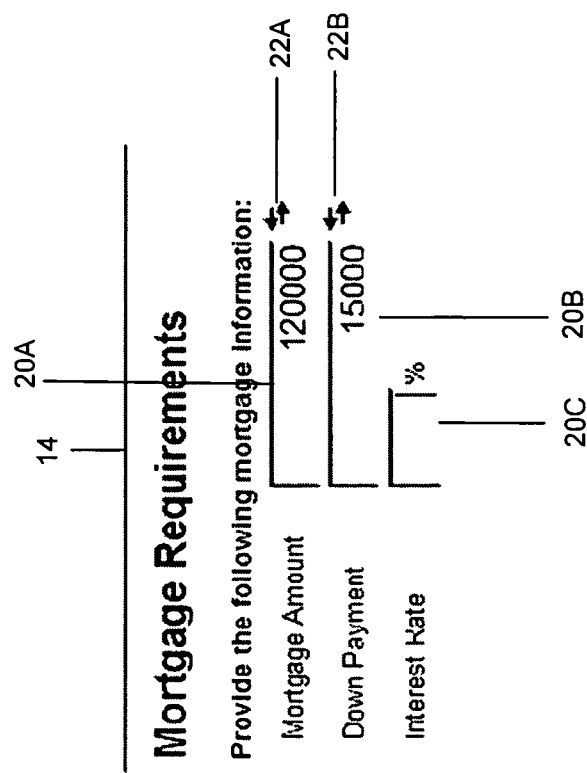
FIG. 5 depicts an illustrative GUI while multiple elements are undergoing a pending asynchronous update.

Referring now to FIG. 4, GUI 14 is shown in greater detail after the asynchronous update of element 20B has been completed. Similar to FIG. 3, indicator 20B has been changed to a second state. Referring to FIG. 5, it is illustrated that multiple asynchronous updates may be pending or a sophisticated implementation may predict or query for all elements associated with an update, and so multiple update indicators 22A-B may be shown at once. Asynchronous updates may also generate multiple asynchronous updates, or the auto-population feature found in many browsers may populate multiple elements with values simultaneously.

II. Computerized Implementation

Figure 6:
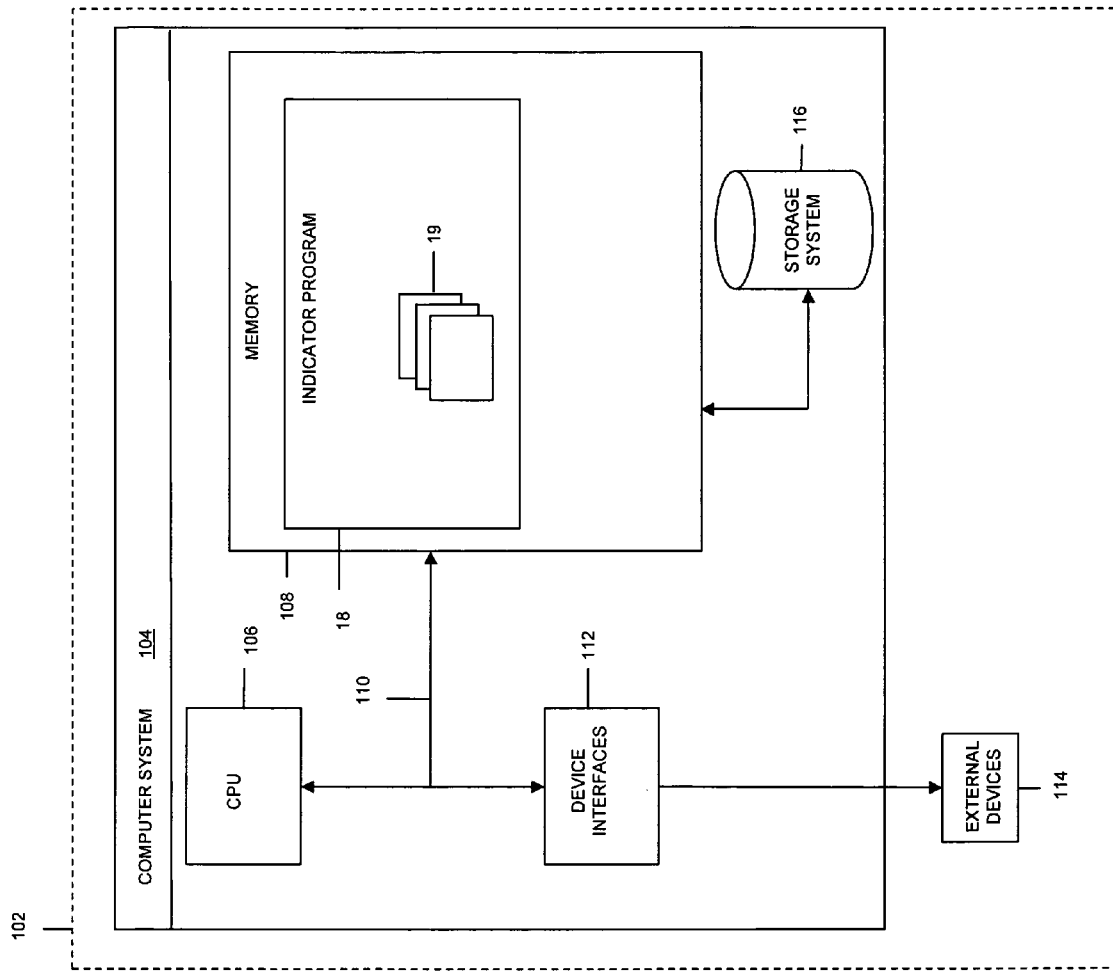
FIG. 6 depicts a computerized implementation of the present invention.

Referring now to FIG. 6, a computerized implementation 100 of the present invention is shown. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, computer system 104 includes a processing unit 106, a memory 108, a bus 110, and device interfaces 112. Further, computer system 104 is shown having external devices 114 and storage system 116 that communicate with bus via device interfaces 112. In general, processing unit 106 executes computer program code, such as indicator program 18, which is stored in memory 108 and/or storage system 116. While executing computer program code, processing unit 106 can read and/or write data to/from memory 108, storage system 116, and/or device interfaces 112. Bus 110 provides a communication link between each of the components in computer system 104. Although not shown, computer system could also include I/O interfaces that communicate with: one or more external devices such as a keyboard, a pointing device, a display, etc.); one or more devices that enable a user to interact with computer system 104; and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external devices. Still further, it is understood that one or more additional components (e.g., system software, math co-processing unit, etc.) not shown in FIG. 2 can be included in computer system 104.

Storage system 116 can be any type of system capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system 104.

Shown in memory 108 of computer system 104 is indicator program 18, which a set of modules 19. The modules generally provide the functions of the present invention as described herein. It should be understood that indicator program 18 can actually comprise one or more programs that are integrated and/or or work in conjunction with one another. In any event, set of modules 19 is configured to enable computer system 108 to perform all functions described herein.

While shown and described herein as an approach to indicate asynchronous updates in a GUI, it is understood that the invention further provides various alternative embodiments. For example, in one embodiment, the invention provides a computer-readable/useable medium that includes computer program code to enable a computer infrastructure to indicate asynchronous updates in a GUI. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 6) and/or storage system 116 (FIG. 6) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to indicate asynchronous updates in a GUI. In this case, the service provider can create, maintain, support, etc., a computer infrastructure, such as computer infrastructure 102 (FIG. 6) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for indicating asynchronous updates in a GUI. In this case, a computer infrastructure, such as computer infrastructure 102 (FIG. 6), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 104 (FIG. 6), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method of managing a graphical user interface (GUI), comprising:
   determining a change made by a user to a data value corresponding to an element in the GUI, the change requiring a first pending asynchronous update of a first set of elements of the GUI by a server,
   wherein each of the element and each element in the first set of elements displays a single, unique data value of a plurality of related data values, and
   wherein the data value corresponding to the element can be initially set by the user and subsequently modified by the server;
   indicating the first pending asynchronous update of the first set of elements with a first set of indicators in response to the determining of the change made by the user, wherein the first set of indicators visually identify each of the first set of elements;
   receiving at least one user interaction for a second set of elements of the GUI during the first pending asynchronous update of the first set of elements including the data value set by the user, the at least one user interaction including at least one of: a change made to a data value corresponding to a second element in the second set of elements or a selection of a second element in the second set of elements; and
   indicating a second pending asynchronous update of the second set of elements with a second set of indicators in response to the receiving of the user interaction, the second set of indicators visually identify each of the second set of elements,
   wherein the indicating of the first pending asynchronous update and the indicating of the second pending asynchronous update occur simultaneously, and
   wherein each element in the first set of elements and the second set of elements comprise a text box.

2. The method of claim 1, wherein the first set of indicators include graphical indicators, and
   wherein the second set of indicators include graphical indicators.

3. The method of claim 1, the indicating further comprising providing the first set of indicators at a first state during the first pending asynchronous update of the first set of elements.

4. The method of claim 3, further comprising changing the first set of indicators to a second state upon completion of the first pending asynchronous update of the first set of elements.

5. The method of claim 1, the indicating further comprising providing a distinct indicator for each of the first set of elements that is undergoing the first pending asynchronous update, each distinct indicator being positioned proximate an element of the GUI that is undergoing the first pending asynchronous update.

6. A system comprising:
   a computer system including a processor, the computer system for managing a graphical user interface (GUI) by performing a method comprising:
   determining a change made by a user to a data value corresponding to an element in the GUI, the change requiring a first pending asynchronous update of a first set of elements of the GUI by a server,
   wherein each of the element and each element in the first set of elements displays a single, unique data value of a plurality of related data values and
   wherein the data value corresponding to the element can be initially set by the user and subsequently modified by the server;
   indicating the first pending asynchronous update of the first set of elements with a first set of indicators in response to the determining of the change made by the user, wherein the first set of indicators visually identify each of the first set of elements;
   receiving at least one user interaction for a second set of elements of the GUI during the first pending asynchronous update of the first set of elements including the data value set by the user, the at least one user interaction including at least one of: a change made to a data value corresponding to a second element in the second set of elements or a selection of a second element in the second set of elements; and
   indicating a second pending asynchronous update of the second set of elements with a second set of indicators in response to the receiving of the user interaction, the second set of indicators visually identify each of the second set of elements,
   wherein the indicating of the first pending asynchronous update and the indicating of the second pending asynchronous update occur simultaneously, and
   wherein each element in the first set of elements and the second set of elements comprise a text box.

7. The system of claim 6, wherein the first set of indicators include graphical indicators, and
   wherein the second set of indicators include graphical indicators.

8. The system of claim 6, the indicating further including providing the first set of indicators at a first state during the first pending asynchronous update of the first set of elements.

9. The system of claim 8, further comprising changing the first set of indicators to a second state upon completion of the first pending asynchronous update of the first set of elements.

10. The system of claim 6, the indicating further including providing a distinct indicator for each of the first set of elements that is undergoing the first pending asynchronous update, each distinct indicator being positioned proximate an element of the GUI that is undergoing the first pending asynchronous update.

11. A program product stored on a non-transitory computer readable storage medium for managing a graphical user interface (GUI), the non-transitory computer readable medium comprising program code for causing a computer system to:
> determine a change made by a user to a data value corresponding to an element in the GUI, the change requiring a first pending asynchronous update of a first set of elements of the GUI by a server,
> wherein each of the element and each element in the first set of elements displays a single, unique data value of a plurality of related data values and
> wherein the data value corresponding to the element can be initially set by the user and subsequently modified by the server;
> indicate the first pending asynchronous update of the first set of elements with a first set of indicators in response to the determining of the change made by the user, wherein the first set of indicators visually identify each of the first set of elements;
> receive at least one user interaction for a second set of elements of the GUI during the first pending asynchronous update of the first set of elements including the data value set by the user, the at least one user interaction including at least one of: a change made to a data value corresponding to a second element in the second set of elements or a selection of a second element in the second set of elements; and
> indicate a second pending asynchronous update of the second set of elements with a second set of indicators in response to the receiving of the user interaction, the second set of indicators visually identify each of the second set of elements,
> wherein the indicating of the first pending asynchronous update and the indicating of the second pending asynchronous update occur simultaneously, and
> wherein each element in the first set of elements and the second set of elements comprise a text box.

12. The program product stored on the non-transitory computer readable storage medium of claim 11, wherein the first set of indicators include graphical indicators, and
> wherein the second set of indicators include graphical indicators.

13. The program product stored on the non-transitory computer readable storage medium of claim 11, wherein the non-transitory computer readable medium further comprising program code for causing the computer system to provide the first set of indicators at a first state during the first pending asynchronous update of the first set of elements.

14. The program product stored on the non-transitory computer readable storage medium of claim 13, wherein the non-transitory computer readable medium further comprising program code for causing the computer system to change the first set of indicators to a second state upon completion of the first pending asynchronous update of the first set of elements.

15. The program product stored on the non-transitory computer readable storage medium of claim 11, wherein the non-transitory computer readable medium further comprising program code for causing the computer system to provide a distinct indicator for each of the first set of elements that is undergoing the first pending asynchronous update, each distinct indicator being positioned proximate an element of the GUI that is undergoing the first pending asynchronous update.

16. A method for deploying a system for managing a graphical user interface (GUI), comprising:
> providing an infrastructure being configured to:
> determine a change made by a user to a data value corresponding to an element in the GUI, the change requiring a first pending asynchronous update of a first set of elements of the GUI by a server,
> wherein each of the element and each element in the first set of elements displays a single, unique data value of a plurality of related data values and
> wherein the data value corresponding to the element can be initially set by the user and subsequently modified by the server,
> indicate the first pending asynchronous update of the first set of elements with a first set of indicators in response to the determining of the change made by the user, wherein the first set of indicators visually identify each of the first set of elements;
> receive at least one user interaction for a second set of elements of the GUI during the first pending asynchronous update of the first set of elements including the data value set by the user, the at least one user interaction including at least one of: a change made to a data value corresponding to a second element in the second set of elements or a selection of a second element in the second set of elements; and
> indicate a second pending asynchronous update of the second set of elements with a second set of indicators in response to the receiving of the user interaction, the second set of indicators visually identify each of the second set of elements,
> wherein the indicating of the first pending asynchronous update and the indicating of the second pending asynchronous update occur simultaneously, and
> wherein each element in the first set of elements and the second set of elements comprise a text box.

17. The method of claim 16, the infrastructure being further configured to provide a distinct indicator for each of the first set of elements that is undergoing the first pending asynchronous update, each distinct indicator being positioned proximate an element of the GUI that is undergoing the first pending asynchronous update.

* * * * *